(12) United States Patent
Gribb et al.

(10) Patent No.: US 7,019,307 B1
(45) Date of Patent: Mar. 28, 2006

(54) DELAY LINE ANODES

(75) Inventors: Tye Travis Gribb, Madison, WI (US); John Joseph Larkin, San Francisco, CA (US)

(73) Assignee: Imago Scientific Instruments Corporation, Madison, WI (US)

(*) Notice: Subject to any disclaimer, the term of this patent is extended or adjusted under 35 U.S.C. 154(b) by 575 days.

(21) Appl. No.: 09/888,940

(22) Filed: Jun. 25, 2001

Related U.S. Application Data

(60) Provisional application No. 60/213,801, filed on Jun. 26, 2000.

(51) Int. Cl.
*G01T 3/00* (2006.01)

(52) U.S. Cl. .............. 250/390.12; 250/374; 250/385.1; 250/370.05

(58) Field of Classification Search .............. 324/76.35, 324/76.54, 71.3, 71.1, 71.4; 250/374, 385.1, 250/388, 397, 370.05, 6, 7, 390.12, 332, 250/506.1; 333/161
See application file for complete search history.

(56) References Cited

U.S. PATENT DOCUMENTS

| 3,359,421 | A | * | 12/1967 | Perez-Mendez et al. . 250/385.2 |
| 3,581,091 | A | * | 5/1971 | Meijer ................... 250/370.05 |
| 4,431,921 | A | | 2/1984 | Filthuth |
| 4,870,282 | A | | 9/1989 | Lacy |
| 4,965,861 | A | | 10/1990 | Filthuth |
| 5,061,850 | A | | 10/1991 | Kelly et al. |
| 5,347,130 | A | | 9/1994 | Berthold |
| 5,347,132 | A | | 9/1994 | Holzman et al. |
| 5,440,124 | A | | 8/1995 | Kelly et al. |
| 5,644,128 | A | | 7/1997 | Wollnik et al. |
| 2002/0014839 | A1 | | 2/2002 | Jagutzki et al. |

FOREIGN PATENT DOCUMENTS

GB  2 359 187 A  8/2001

OTHER PUBLICATIONS

Friedman et al., "Multilayer anode with crossed serpentine delay lines for high spatial resolution readout of microchannel plate detector," Rev. Sci. Instrum. 67(2), 596-608 (Feb. 1996).

Siegmund et al., "A high resolution delay line readout for microchannel plates," EUV, X-Ray, and Gamma-Ray Instrumentation for Astronomy and Atomic Physics, Proc. SPIE 1159, 476-485 (1989).

* cited by examiner

*Primary Examiner*—Hai Pham
*Assistant Examiner*—Lam Nguyen
(74) *Attorney, Agent, or Firm*—Craig A. Fieschko, Esq.; DeWitt Ross & Stevens S.C.

(57) ABSTRACT

In detectors for imaging and other applications, delay line anodes are arrayed so as to allow detection of the location and/or timing of particle hits. The anodes are arrayed to provide an upper anode and one or more lower anodes, with particles incident on the upper anode passing in turn to the lower anodes. The anode arrays allow the use of identically manufactured anodes which are maintained in parallel spaced relation along the travel path of the particles of interest without dielectric material or other structure situated between the anodes. The spacing between the anodes is preferably adjustable so as to allow the installer and/or user to modify the performance characteristics of the array. The anodes may be made of pre-formed metal foil signal and ground layers laminated onto opposing sides of a dielectric sheet, or may be etched or otherwise formed from flex circuit material, so that the anodes and the overall array are light weight, compact, and flexible.

45 Claims, 6 Drawing Sheets

DELAY LINE ANODES

CROSS-REFERENCE TO RELATED APPLICATIONS

This application claims priority under 35 USC § 119(e) to U.S. Provisional Patent Application 60/213,801 filed 26 Jun. 2000, the entirety of which is incorporated by reference herein.

FIELD OF THE INVENTION

This disclosure concerns an invention relating generally to delay line anodes, and more specifically to methods for fabricating delay line anodes and delay line anode arrays with improved electrical properties, particularly delay line anode arrays employed in time- and position-sensitive particle detectors such as those used in imaging applications.

BACKGROUND OF THE INVENTION

Delay line anodes are apparata used in time- and/or position-sensitive detectors to encode the time and position of impact of particles (e.g., electrons, atoms, ions, molecular complexes, etc.) and/or photons incident upon the detector. The function and operation of delay line anodes in such detectors is briefly described here to provide the reader with a better understanding of the background of delay line anodes, but if further background information is needed, the reader is referred to the discussions in U.S. Pat. Nos. 4,431,921 and 4,965,861 to Filthuth, and U.S. Pat. No. 5,644,128 to Wollnik et al.

Prior to further discussion of delay line anodes, it is initially important to note that this document generally refers to several delay line detectors (and other detectors) as "anodes," which implies that these devices generate signals by collecting electrons. In typical practice, this is indeed the case. However, such detectors have also been used in arrangements whereby signals are introduced into the delay line via an electromagnetic pulse (EMP). As there is no transfer of electrons in this case, the delay line detector is not technically an anode. However, for simplicity, this document uses the term "anode" to refer to both cases because the fundamental operating principles are similar.

In typical time- and/or position-sensitive detectors, exemplified by the arrangement shown in FIG. 1, the particle or photon of interest ("PoI") incident upon the detector 100—the PoI being depicted by its flight path 102—is first converted into a relatively large number of electrons (generally approximately $10^2$–$10^8$ electrons, depicted at 104) via an electron amplification device (EAD) 106. The EAD 106 is typically a microchannel plate (MP), microsphere plate (MSP), or gas electron multiplier (GEM), though other means of electron amplification are possible. The centroid of the electron cloud 104 generated by the EAD 106 corresponds to the position at which the PoI 102 struck the EAD 106. Most EAD 106 are insensitive to photons, and therefore in photon detection applications, a photocathode such as cesium iodide is often placed between the incident photon 102 and the EAD 106 to convert the photon 102 into electrons that impact the EAD 106 and trigger the amplification event. The electron cloud 104 generated by the EAD 106 is then driven via a bias voltage to one or more delay line anodes, with two such anodes being depicted in FIG. 1 by upper delay line anode 108 and lower delay line anode 110, for encoding of the time and position of impact of the electron cloud 104 on the delay line anode(s).

A delay line anode typically has a delay line, i.e., a conducting signal line coupled with a ground line, arrayed over the imaging or active area of the delay line anode in a manner such that a position or coordinate in the dimension of interest corresponds to a distance or length along the delay line. Generally, the relationship between the position/coordinate in the dimension of interest and the distance along the delay line is linear, but other relationships (e.g. nonlinear, radial, spiral) can be implemented. Each dimension for which position is to be determined generally requires a minimum of one delay line anode. Accordingly, two delay line anodes may be used in order to encode position in two dimensions, as in FIG. 1, wherein anode 108 encodes position in the Y direction and anode 110 encodes position in the X direction. Additional anodes can be used to provide redundant information for double-hit encoding (i.e., where subsequent electron impacts may occur before signals from a prior electron impact leave an anode) and for other purposes.

When the electron cloud 104 impacts the delay line anode 108 or 110 (directly or via other means), an electromagnetic signal is induced in the delay line anode, and it propagates as two distinct pulses (EMP), one towards each end of the anode's delay line. Each end of the delay line is connected to a series of timing components 112 whose function is to determine the arrival time of the EMP at that end, such that the arrival times of the two EMP at opposite ends of the delay line are independently measured and encoded. Several timing components are typical. Initially, each end of the delay line is often connected to a high-speed, low-noise preamplifier that amplifies the EMP (generally by a factor of 10×–100×). The preamplifier is often followed by a pulse shaper which modifies the EMP into a more easily monitored timing pulse, with such a pulse shaper being exemplified by a constant fraction discriminator (CFD). A CFD converts the near-gaussian-shaped EMP of varying amplitude into a sharp timing pulse that corresponds to the arrival time of the pulse at the end of the delay line. The pulse shaper is then often followed by a time-to-digital converter (TDC) that measures the arrival time of the timing pulse. Other components may be included in the timing components 112 as well, but the relevant physical relationship is that the difference in the arrival times of the two EMP at the opposite ends of a given delay line corresponds to the time and position of impact of the original event, i.e., to the impingement of the electron cloud on the delay line anode. The time and position of impact is in turn used to calculate desired experimental quantities such as the mass of the PoI.

Detector performance is characterized by the speed, accuracy, and precision with which the detector interprets impact events. Performance is limited by properties inherent in the EAD 106, the delay line anode(s) 108 and 110, the timing components 112, and in the interaction between these components. The limiting factor for resolution of a delay line anode detector is typically in the timing components 112, e.g., in pulse shaper accuracy or the accuracy with which the pulse shaper converts the amplified EMP from the signal line into a timing pulse. Pulse shaper accuracy is in turn dependent upon size and shape distributions of input EMP. Input EMP that are large and sharp minimize inaccuracies that may arise from pulse voltage measurement errors. Further, consistent input EMP size and shape allows tuning of a pulse shaper to a particular pulse shape, which also improves the accuracy of the pulse shaper and the detector.

Typically, preamplifiers, pulse shapers, and/or other timing components are custom designed and fabricated according to the electrical properties of the delay line anode(s) with which they will be used. Alternatively, prefabricated high performance preamplifiers and pulse shapers may be tuned or adjusted to optimize performance with the delay line anode(s) with which they will be used. In order to minimize the time and cost of achieving a satisfactory match between timing components to the delay line anode(s) of the detector, it is desirable to employ a fabrication technique that produces a delay line anode with consistent properties such that timing components can be designed for mass production and fabricated in quantity, rather than being designed, fabricated, and/or tuned on an anode-by-anode basis.

Apart from the timing components, the delay line anode can affect detector accuracy by affecting the size and sharpness of the input EMP into the timing components through attenuation, and also by impedance mismatch between the anode and the timing components. Attenuation, the amount of energy lost per unit length of delay line traveled by an EMP, is a fundamental property of a transmission line that is dependent upon numerous factors (such as the dimensions of the signal and ground lines, the DC resistance of the signal line, loss properties of the dielectric layer between the signal and ground lines of the delay line, and the thickness of the dielectric). For any given length of the delay line, there is a tradeoff between minimizing attenuation and maximizing resolution. Longer delay line length means that the EMP travel for a longer period of time in the delay line, which results in better resolution for a given timing accuracy since the differences in EMP arrival times at the ends of the delay lines will be greater. However, for a given active area on the delay line anode, longer delay line length increases attenuation in two ways: the longer distance traveled in the delay line attenuates EMP, and additionally the width of the delay line must be made smaller (thereby increasing attenuation) in order to accommodate the added delay line length within the same active area. Conversely, shorter delay line length has the advantage of less attenuation of EMP, and additionally a detector that employs anodes with shorter delay lines can record more events in a given time since the EMP exit the delay line in a shorter time. However, the shorter the delay lines, the less difference in the arrival times of the EMP at opposite ends of the delay line, and therefore the timing components must be more accurate in order to obtain the same resolution as a detector employing longer delay lines.

As previously noted, it is also desirable to minimize impedance mismatch between the delay line anode and the timing components (and also between the timing components themselves). Impedance mismatch reduces the speed at which the detector can record events because mismatch causes reflections of the EMP at the point of mismatch. The reflected portion of the EMP can propagate back through the detector, thereby increasing the time before EMP clears the detector, thereby slowing the maximum rate at which the detector can record events (unless complex algorithms are used to interpret EMP arrivals, which is preferably avoided). Similarly, unless precautions are taken, the reflected EMP may create a spurious timing event at the other end of the delay line.

It is believed that an arrangement such as that shown in FIG. 1, wherein a detector utilizes multiple delay line anodes having delay lines arrayed in serpentine layers, was first proposed by Siegmund et al. ("A high resolution delay line readout for microchannel plates," *EUV, X-Ray, and Gamma-Ray Instrumentation for Astronomy and Atomic Physics*, Proc. SPIE 1159, 476–485 (1989)). Advantages of this multilayer serpentine delay line detector arrangement are high resolution over a relatively large area, high throughput rate, good spatial linearity, simplicity, reliability, low power requirements, and a robust design. Friedman et al. ("Multilayer anode with crossed serpentine delay lines for high spatial resolution readout of microchannel plate detector," *Rev. Sci. Instrum.* 67(2), 596–608, February 1996) describe one possible scheme and fabrication method for a detector arrangement of this type, wherein two serpentine microstrip delay line anodes are used to encode positional information in two dimensions. Of particular interest is the method proposed for fabrication of the detector, which will now be described with reference to FIG. 2. The two anodes of the detector are fabricated separately using commercially developed methods for microstrip printed circuit board fabrication. Each of the two anodes begins as a double-sided, copper-clad, RT/DUROID 6010 ceramic-filled PTFE dielectric board (Rogers Corp., Chandler, Ariz.). On the upper side of each board, copper is etched away using standard photolithography techniques to leave only a single serpentine signal line with solder pads at its ends. The lower side of each board is the ground plane (ground line) for the signal line situated on the upper side of that board. As will be discussed below, the boards/anodes will be bonded together in generally coplanar relationship, and thus the foregoing arrangement is shown in FIG. 2 with one board (the upper anode) of the detector 200 shown at 202, with the upper anode 200 including upper signal line 204 and upper ground line 206 spaced by the board's dielectric material 208. The upper ground line 206 is etched so that it extends in a serpentine pattern in parallel spaced alignment with the upper signal line 204. Similarly, the other board (the lower anode) is depicted as 210, and includes lower signal line 212 and lower ground plane 214 spaced by the lower board's dielectric material 216. Here, the lower ground plane 214 may be (but need not be) etched to mirror the lower signal line 212. Note that in FIG. 2, the signal lines 204 and 212 are oriented in generally perpendicular directions, as in FIG. 1, and thus the upper delay line (the upper signal line 204 and upper ground line 206) is shown with lengths extending out of the drawing toward the viewer, while the lower delay line (the lower) signal line 212 extends in a perpendicular direction and thus has lengths running parallel to the plane of the drawing. (The lower ground place 214 may also extend in this direction if etched to have such an orientation.)

The contiguous, multilayer anode array is made by bonding the two anodes 202 and 210 together with a back plate 218 using BONDPLY bonding agent, depicted in layers at 220 and 222. The BONDPLY bonding agent is a less dense/more porous form of RT/DUROID 6002 ceramic- and glass-filled PTFE dielectric, and under heating to 385° C. under 1700 psi pressure, it converts into RT/DUROID 6002 material and thereby fuses adjacent materials that have appropriately treated surfaces. This bonding is done in two steps. First, the back plate 218 is bonded to the lower ground plane 214 of the lower anode 210 at bonding agent layer 220, then the lower signal line 212 layer of the lower anode 210 is bonded to the upper ground line 206 of the upper anode 202 at bonding agent layer 222. The upper bonding agent layer 222 must generally be thick in order to diminish crosstalk between the top and bottom anodes 202 and 210.

During the foregoing process, the upper anode dielectric layer 208 is continuous. However, proper functioning of the delay line readouts requires removal of the dielectric material 208 bounding the upper delay line (e.g., between the segments of the upper signal line 204 and upper ground line 206), as well as the portions of the dielectric upper bonding agent layer 222 adjacent the upper delay line, to expose the lower signal line 212 and thereby allow electrons from the electron cloud to reach the lower signal line 212. Such removal is generally performed by laser ablation machining. The resulting detector resembles the one illustrated in FIG. 1, though the illustrated upper and lower delay lines 108 and 110 are not an entirely accurate depiction, particularly in that they generally do not have all excess dielectric removed as in FIG. 1 and are generally provided with some form of support structure. Most particularly, the lower delay line 110 is often provided in a continuous circuit board rather than in the freestanding serpentine array shown.

A primary disadvantage of this fabrication method is the need to remove multiple layers of dielectric material 208 and 222 by laser ablation machining in order to expose the lower anode 210 and its signal line 212. This machining is difficult and expensive, particularly owing to the high aspect ratio (ratio of depth to width)—approximately 4:1—of the channels of dielectric that are ablated. The need for deep cutting significantly heats the board, often resulting in warping and imperfect production unless cutting is done in multiple stages, which greatly increases manufacturing time and cost.

Apart from problems with the fabrication method, there are numerous disadvantages with the structural features of anodes made by the foregoing method. First, the resulting anode array detector is often incompatible with Ultra High Vacuum (UHV) environments. The detector is fabricated using standard printed circuit board techniques and materials, but standard circuit board materials are incompatible with UHV environments due to insufficient temperature stability and outgassing. Most typical printed circuit board materials are stable at temperatures up to approximately 120° C.; however, UHV environments typically require that materials be stable to approximately 150°–200° C. In addition, most adhesives and circuit board materials used in traditional printed circuit board manufacture continuously release gas, and this is similarly unsuitable for use in UHV environments.

Second, the need to bond the two anodes/boards 202 and 210 together results in undesirable nonuniformity in detector properties. Variation in the thickness of the upper bonding agent layer 222, and/or variation in distance between signal lines 204 and 212, will affect the impedance of both of signal lines 204 and 212. In particular, owing to the presence of the upper ground line 206, the thickness of the upper bonding agent layer 222 strongly affects the electrical properties of the lower signal line 212. In general (but depending on the bonding materials used), the thinner the upper bonding agent layer 222, the slower the EMP propagation speed, the higher the attenuation, and the lower the impedance. The effects of variation in bond thickness/distance are further amplified by the fact that the bonding agent layer 222 has a relatively high dielectric constant (generally having a relative dielectric coefficient of approximately 4). As a result, the impedance of the lower signal line 212 will be difficult to accurately control, thus causing problems with impedance matching to the timing components 112 and other components. As one might expect, if the upper and lower signal lines 204 and 212 display different performance characteristics—as they almost inevitably will do—the complexity of the timing components 112 grows and results become more difficult to interpret. Therefore, to achieve maximum performance, the electronics and/or other components for the upper and lower signal lines 204 and 212 must be fabricated to different specifications or, at a minimum, must be tuned differently. This precludes efficient mass production of a complete detector assembly.

Third, the permanence of the bond between the two anodes 204 and 210 is also disadvantageous in that if one anode is found to be defective after bonding to the other anode, the entire detector must be scrapped. This potentially results in discarding a non-defective anode along with the defective one, thereby increasing losses from wasted time and materials.

Fourth, detector accuracy is partially dependent on alignment of the two delay lines in a known orientation—typically 90°—but the nature of the bonding process used to bond the upper and lower anodes 202 and 210 together makes precise positional registration between their delay lines difficult to achieve. Heat and pressure are required to activate the bonding function of the upper bonding agent layer 222, and shifting due to flow of the bonding agent between the upper and lower anodes 202 and 210 may occur under these conditions. Further, since bonding renders the anode alignment permanent, deviations from the desired alignment cannot be corrected after the bonding is completed.

Fifth, the active area of a standard printed circuit board anode (i.e., the area over which the delay line receives particles) is practically limited by the resistance of delay lines having widths achievable with standard printed circuit board fabrication methods, which is typically 60 microns or less. If delay lines are thinner, more may be fit within any given active area; however, thinner lines have higher electrical resistance, and thus can exhibit undesirable characteristics (in particular higher attenuation).

Sixth, anodes fabricated using standard printed circuit board techniques are generally limited to a planar form. If it is desirable to have a nonplanar or otherwise irregularly-shaped anode, or an anode with changeable configuration, the foregoing scheme seems inapplicable as a practical matter because the etching, bonding, ablation, etc. are difficult to economically perform on non-planar boards.

Seventh, the foregoing fabrication scheme gives rise to limitations in the resulting anode. Standard printed circuit board manufacturing techniques etch the desired pattern into the conductor from the top/exposed side of the conductor, and thus the width of the etched signal line 204 or 212 is smaller at the top surface of the board 202 or 210 than at the bottom of its signal line (the portion bonded to the dielectric layer 208 or 216). The resulting signal lines have a trapezoidal cross-section with a narrow top and wider base, and more DC resistance for a given maximum width than a signal line of non-varying width.

There have been efforts to develop anodes and fabrication methods which avoid the foregoing problems. One fabrication method eliminates the difficult and costly laser ablation machining by changing the form of the upper delay line anode. In this scheme, the lower delay line anode is not exposed—its signal line remains "buried" beneath the upper delay line anode and the intermediate bonding layer—and the signal generated by the incident electron cloud is transferred to the lower signal line from the upper anode by conductive leads called vias. Although this scheme eliminates the problems of laser ablation, the vias add cost and complexity to the fabrication process. Further, each via adds a capacitive load to the signal line, thus significantly altering its electrical properties (generally decreasing impedance and pulse amplitude, and slowing propagation speed). Finally, the vias act as miniature antennae between the two signal lines, increasing crosstalk between lines and dissipation of the signal, which ultimately decreases the overall performance of the anodes. The vias also cause the bottom signal line to display significantly different electrical and performance characteristics compared with the top signal line, thereby reducing the possibility that timing and other components having the same characteristics can be used for the top and bottom anodes.

To summarize, prior delay line anode fabrication methods are difficult and costly to execute, and they yield multi-anode detectors wherein the component anodes display significantly different electrical characteristics, thereby complicating electronics and interconnection issues and ultimately limiting detector performance.

SUMMARY OF THE INVENTION

The invention, which is intended to at least partially solve the aforementioned problems, involves delay line anodes, anode arrays and detectors made therefrom, and fabrication methods for the foregoing. The invention is particularly suitable for preparing delay line anodes for use in fast-timing position-sensitive detectors, e.g., large-area x-ray diffraction detectors. To give the reader a basic understanding of some of the invention's advantageous features, following is a brief summary of preferred versions of the invention. As this is merely a summary, it should be understood that more details regarding the preferred versions may be found in the Detailed Description set forth elsewhere in this document. The claims set forth at the end of this document then define the various versions of the invention in which exclusive rights are secured.

To summarize, preferred versions of the invention include one or more of the following features (with other features being described elsewhere in this document):

Lack of Bonding Agent (or Other Structure) Between Anodes in Multi-Anode Arrays: Preferred anode arrays made in accordance with the invention do not require that bonding agent or other structure be situated between the anodes (or at least between their active areas) in the array. Thus, the foregoing problems arising from the bonding agent layer—its effect on the properties of the lower signal line, thickness variation problems, the need for laser ablation or other material removal, inability to alter anode spacing if thickness is unsuitable, etc.—can be alleviated or avoided entirely. Since the bonding agent layer may be replaced with a vacuum or a desired gas, the dielectric effect of the bonding agent layer is more easily managed, and the need to remove sections of the bonding agent by laser ablation or other methods to allow passage of particles is avoided.

Adjustable Spacing Between Anodes in Multi-Anode Arrays: Preferred anode arrays made in accordance with the invention do not irreversibly affix the anodes together in a fixed spaced relation, and thus users can respace the anodes for tuning, realignment, and repair/replacement reasons. The ability to remove, replace, and/or respace anodes in an array allows removal of an anode and replacement with an anode of the same or a different type, respacing anodes to tune the array to have desired characteristics, and/or addition of further anodes to the array (and respacing of all anodes for tuning) as desired.

Use of Identical Anodes in Multi-Anode Arrays: Preferred anode arrays made in accordance with the invention also allow the use of the same type of delay line anode for some or all anodes within an array, greatly enhancing the possibility of mass production of the anodes (and thus reducing their costs). The anodes within an array may be entirely identical, allowing them to be used interchangeably within an array without a substantial impact on performance. Alternatively, the anodes may be identical only in their active areas, or may be identical save for some material being removed on the upper anode(s), e.g., dielectric and ground layers may be removed in areas between signal lines of the upper anode(s) so as to allow passage of particles to the lower anode(s). In any case, the anodes will have one or more of the same signal line dimensions and configuration, the same dielectric layer thickness, and/or the same signal or ground layer thickness, and the economy and ease of manufacture of anodes and associated timing components is enhanced since the use of anodes with uniform characteristics allows greater predictability.

Anodes Formed of Laminated Foils: A preferred anode (and anode arrays made therefrom) has signal and ground layers formed of metal foil, which may be die cut or otherwise subjected to material removal processes to define signal lines on the signal layer (and ground lines, if any, on the ground layer). The signal and ground layers are placed on opposing sides of a thermoplastic film which is to serve as the dielectric layer, and are laminated thereon to connect the layers and thereby form the anode. If desired, the dielectric layer may be processed by material removal methods either before or after lamination to remove excess dielectric material surrounding the delay line, and thereby allow the passage of particles to subsequent anodes. Because the signal lines (and ground lines, if any) can be formed by removing material from one or both sides of the foil by methods which avoid the disadvantages of prior printed circuit board processing methods, and because the foils can be chosen to provide an anode with superior attenuation and impedance properties, the resulting anode has high quality and superior performance at relatively low cost. Efficiency is also enhanced because the various layers of the anode are individually manufactured, allowing greater opportunities for inspection and rejection of individual defective components before they are irreversibly incorporated in an anode or detector. Additionally, the resulting anodes are flexible— for example, they can adopt a high angle of curvature (45° or more) without cracking—which is advantageous for situations where nonplanar anodes are useful, and/or where a flexible anode might be useful for purposes of space conservation.

Anodes Formed of Flex Circuit Material: Other preferred anodes (and arrays made therefrom) are formed of flex circuit material, i.e., materials commonly used in the construction of flexible leads and boards (generally used where such leads/board must serve as a flexible hinge or flap when in use). Such anodes have generally the same advantages as those formed using the aforementioned lamination method. However, flex circuit anodes may be less suitable for large-area particle detectors (on the order of 10 cm×10 cm at the time this document is written) since their properties may not be as optimal as anodes formed by the lamination method.

The foregoing apparata and methods can result in one or more of the advantages of reduced anode manufacturing difficulty and cost; reduced coupling and crosstalk between signal lines in multi-anode arrays; more consistent properties among the anodes in multi-anode arrays; lower DC resistance for improved signal shape and amplitude, and larger active area readout; adjustable impedance for ease of impedance matching with detector components; UHV-compatible anodes for UHV applications; the ability to employ flexible/bendable, variable-configuration anodes, which is advantageous in certain applications; and other advantages as well. Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
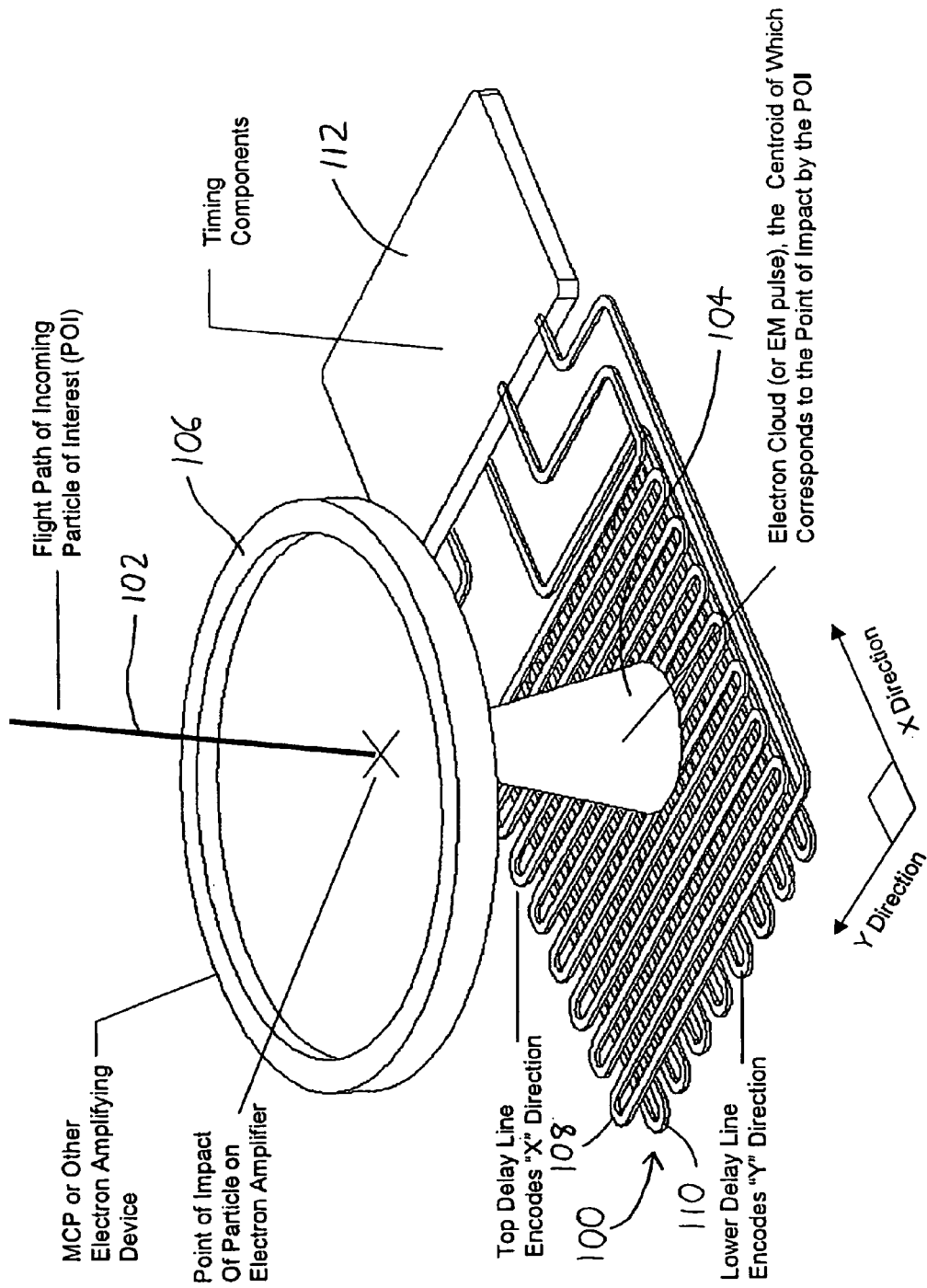
FIG. 1 is a perspective view schematically illustrating an exemplary detector arrangement using an array of delay line anodes 108 and 110.

A first preferred version of the invention will now be described with reference to FIG. 3, wherein an exemplary single delay line anode 300 is shown in an exploded view. The anode 300 includes an upper signal line layer 302, a middle dielectric layer 304, and a bottom ground layer 306 shown in spaced relation (with a portion of the dielectric layer 304 cut away so that the ground layer 306 is more easily viewed). The upper signal line layer 302 and bottom ground layer 306 are formed of pre-patterned metal foils cut into the illustrated configuration by die cutting, laser cutting, water jet cutting, or other material removal processes, including etching and photolithographic processes. It is noted that laser cutting and etching processes are not as disadvantageous for the anode 300 as they are in prior art anode manufacturing processes since the foils used to form the signal line layer 302 and ground layer 306 may be thicker than the conductive layers in standard printed circuit boards, thereby making resistance less of an issue, and additionally the cutting/etching processes may be performed from both sides of the foils to minimize the aforementioned disadvantages of top-down material removal processes. The dielectric layer 304 is formed of a heat-bondable dielectric material, e.g., a heat-sealable polyimide such as KAPTON FN (DuPont, Wilmington, Del., USA) which allows the signal line layer 302 and ground layer 306 to be firmly bonded to its opposite sides with the application of heat. The end result provides a delay line anode 300 wherein the conductive foil signal line layer 302 and ground layer 306 sandwich the dielectric layer 304.

For ease of manufacture, the signal line layer 302 and ground layer 306 may be identically manufactured, and which together define a serpentine delay line 308 which joins a border 310 at tabs 312 spaced at intervals along its length. The tabs 312 may remain in the ground layer 306 for grounding purposes, but should be removed from the signal line layer 302. This may be done either prior to or after lamination by subjecting the signal line layer 302 to another material removal process wherein the tabs 312 are removed.

If the anode 300 serves as an upper delay line anode in a multi-anode array, it will be desirable to remove material from the dielectric layer 304 between the serpentine delay line 308 of the signal line layer 302 and ground layer 306, i.e., between the signal and ground lines, so that the electron cloud may more easily reach subsequent delay line anodes. The excess dielectric material may be removed prior to or after lamination by suitable material removal processes. If no delay line anodes are to be placed after the anode 300 along the path of an electron cloud, it is generally not necessary to remove the excess dielectric, though such removal may still be performed if desired (e.g., to decrease weight, increase flexibility of the anode 300, better match its characteristics with other anodes in an array, etc.)

To illustrate the fabrication methodology for a delay line anode such as anode 300, a more detailed description of exemplary fabrication steps will now be provided. Two pieces of 0.125 mm thick copper foil are each fabricated into the desired pattern for the signal line layer 302 and ground layer 306 via photolithography by a manufacturer such as FotoFab Inc. (Chicago, Ill., USA). A sheet (or sheets) of KAPTON FN polyimide film (DuPont, Wilmington, Del., USA) to serve as the dielectric layer 304 is cut to the appropriate size via any standard cutting method (by shears, use of a router, etc.). In succession, the ground layer 306, dielectric layer 304, and signal line layer 302 are mounted in a press and are precisely aligned. Such alignment can be assisted by use of alignment means such as the mounting holes 314 shown in FIG. 3, though other structure for assuring precise registration between the layers could be used instead. If necessary or desirable, alignment can be assisted via optical (e.g., laser) sighting or other means of assisting alignment and registration of components. The lamination is then completed by subjecting the layers to the heat and/or pressure cycle recommended by the manufacturer of the dielectric layer 304, or by such a cycle as is found to be appropriate for the dielectric in question. After lamination, if the anode 300 is to serve as the upper anode in a multi-anode array, the dielectric material between the serpentine delay lines 308 in the active area (i.e., the area to receive electrons) may be removed by one of many removal methods such as ablation by a $CO_2$ laser (with such removal being performed by many service providers, such as Resonetics, Nashua, N.H., USA). Finally, the tabs 312 which attach the delay line 308 to the surrounding border 310 on the signal line layer 302 are removed by computer controlled milling or other methods.

In alternative versions of the invention, the prepatterned metal foils used for the signal line layer 302 and ground layer 306 are separated by a layer (or layers) of dielectric which are patterned before lamination occurs, thereby diminishing or avoiding the need for dielectric removal after the lamination step. Such dielectric removal may occur via standard die-cutting or other material removal operations.

This lamination method can result in improved anode characteristics over prior printed circuit board anodes because the foils used for the signal line layer 302 (and the ground layer 306) can be thicker than those used in standard printed circuit boards (which are generally approximately 60 microns at the time this document is written), and thicker signal lines have lower DC resistance and improved signal characteristics. Further, the precision with which foils can be prepatterned using current manufacturing technology far exceeds the precision typically obtained in current printed circuit board manufacture, and again this allows a decrease in DC resistance (as by allowing uniform trace width) and improves electrical properties. Decreased DC resistance is particularly important for large area detectors, wherein EMPs must travel greater distances before being processed.

The lamination method is also advantageous in that the material and the of the dielectric layer 304, and therefore the properties of the resulting anode 300, can be changed during anode manufacture without the need to change any patterning in the signal line layer 302 and the ground layer 306. The manufacturer may simply choose a dielectric of a different type and dimensions. This allows a manufacturer the ability to "tune" the electrical properties of an anode 300, while allowing savings through the use of the same stock patterned metallic foils for a variety of applications.

Figure 4:
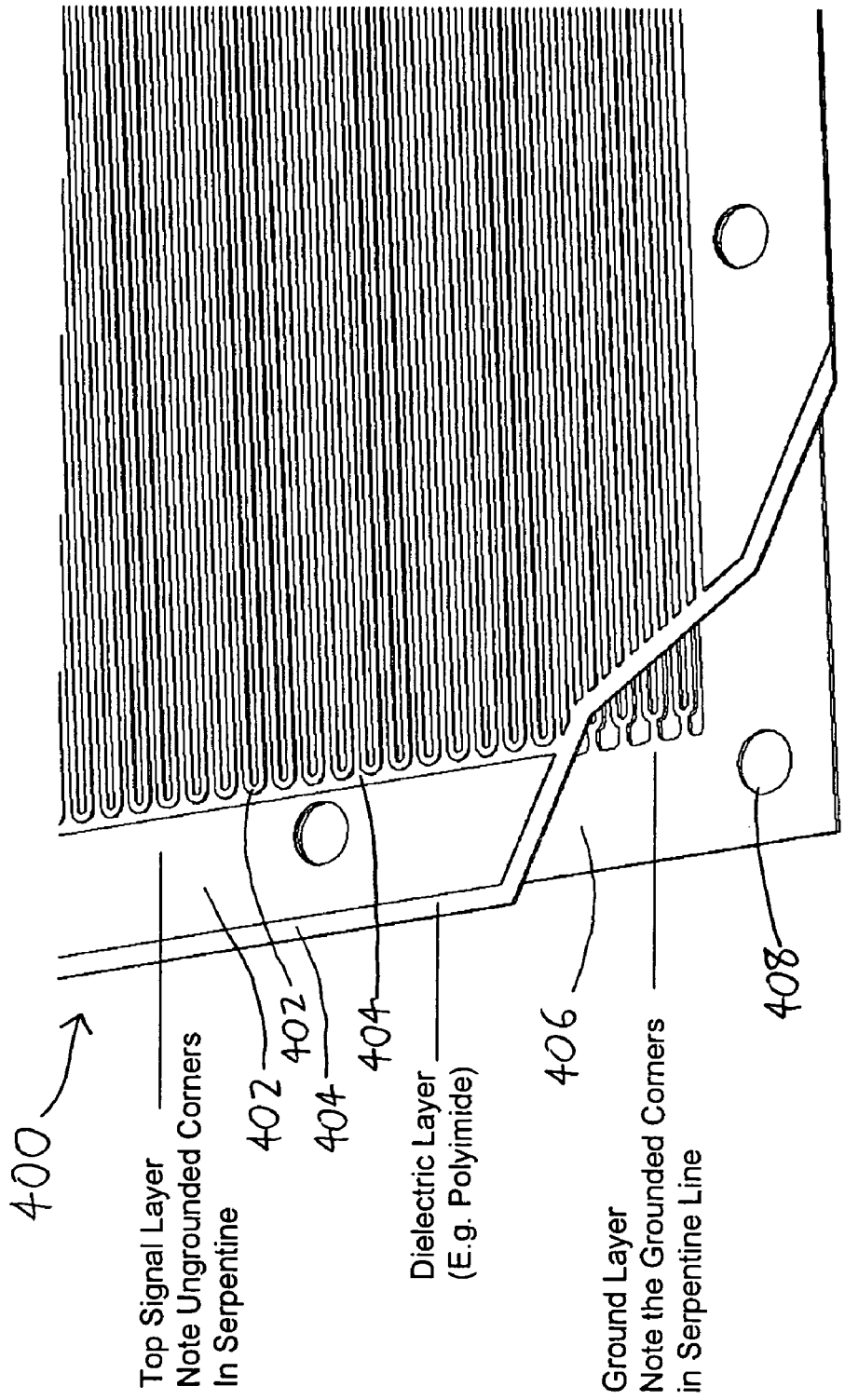
FIG. 4 is a top partial sectional perspective view of another exemplary delay line anode manufactured from a "flex circuit" in accordance with the present invention, shown with the signal line layer 402 and dielectric layer 404 partially cut away to yield a view of the ground layer 406 beneath.

Another preferred version of the invention is illustrated in FIG. 4, wherein an exemplary single delay line anode 400 is shown in a partial sectional view. A signal line layer 402 and a dielectric layer 404 are shown partially cut away to reveal the ground layer 406 beneath. Here, the delay line anode 400 is formed of "flex circuit" material commonly used to manufacture flexible circuit boards, e.g., adhesiveless polyimide circuit board material such as DuPont AP series flex circuit material. The conductor layers on each side of the flex circuit sheet are photolithographically etched or otherwise processed to create the desired patterns for the signal line layer 402 and ground layer 406, with such etching processes being provided by many providers (e.g., Century Circuits, St. Paul, Minn., USA). Depending on the process used, the formation of the patterns can be subject to some of the disadvantages of "top down" etching noted previously. Thus, this version of the invention is more suitable for applications in which DC resistance is not a significant issue, as in smaller detectors (currently less than about 10 cm×10 cm).

Once the desired patterns are formed in the signal line layer 402 and ground layer 406, excess portions of the dielectric layer 404 may be removed by mechanical milling, laser ablation machining, or other material removal processes if it is necessary or desirable to do so (as where another delay line anode will be situated beneath delay line anode 400). Similarly to the delay line anode 300 of FIG. 3, the delay line anode 400 is shown bearing mounting holes 408, the purpose of which will be explained later.

Figure 3:
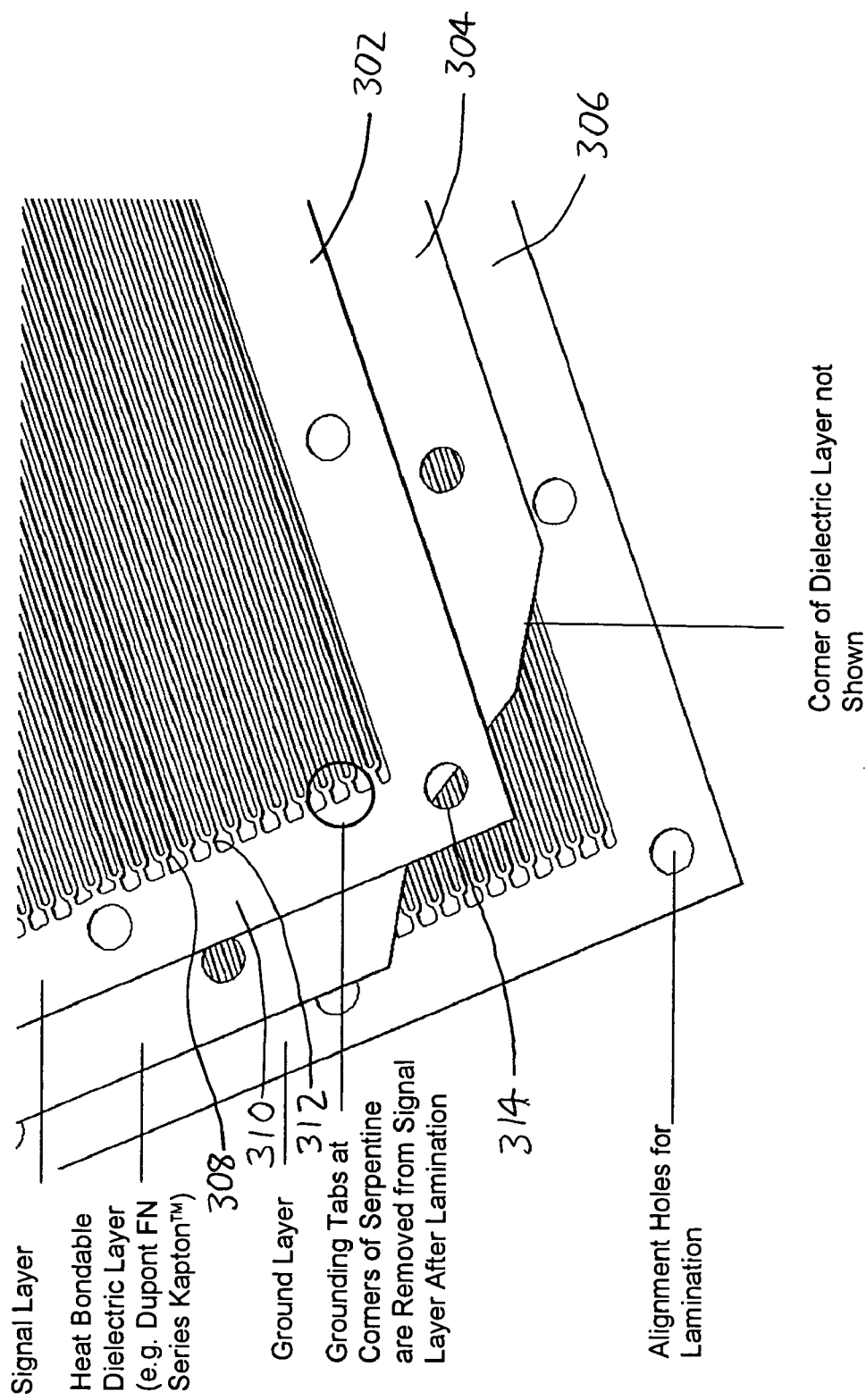
FIG. 3 is a top exploded perspective view of exemplary delay line anode manufactured in accordance with the present invention by use of lamination techniques described elsewhere in this document.

Several advantages are shared by both the laminated anodes 300 of FIG. 3 and the flex circuit anodes 400 of FIG. 4. One significant advantage is that their fabrication methods employ materials and process steps that are UHV compatible, allowing use of the resulting delay line anode in UHV environments, which are common in several important applications such as microscopy (e.g., atom probe microscopes) and detectors for satellite and space applications. Another advantage is that both the laminated anodes 300 and the flex circuit anodes 400 are quite flexible, allowing production of curved anode arrays for detector applications where this configuration may be desirable. For example, curved detectors can be useful in X-ray diffraction, and the ability to curve or bend parts of a detector can also be useful in applications where space concerns are critical.

Figure 5:
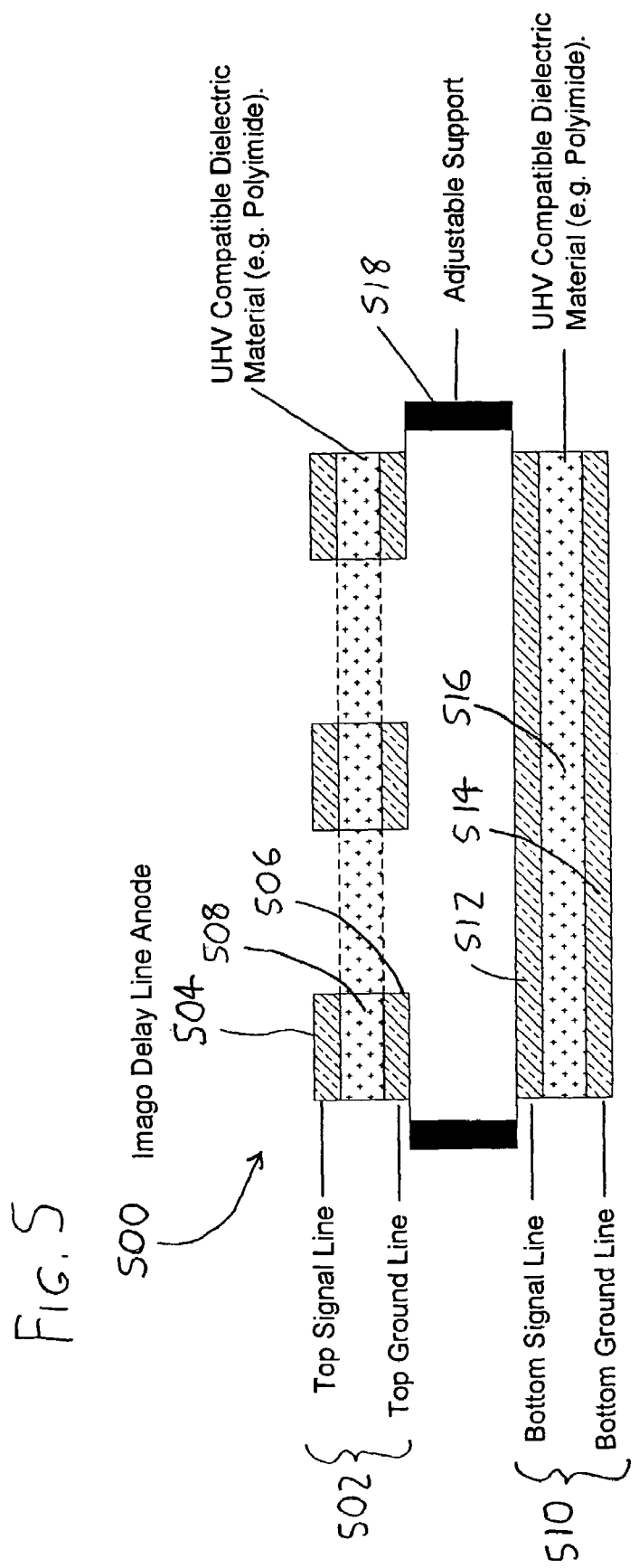
FIG. 5 is a sectional elevational view of an exemplary dual-anode detector array in accordance with the present invention.

The invention also encompasses multi-anode detector arrays utilizing two or more anodes such as anodes 300 and 400. In particularly preferred versions of such multi-anode arrays, the anodes making up the array are mechanically held in fixed relation such that individual anodes are not permanently altered by the holding process; the relative positioning of the individual anodes may be adjusted after they are placed in fixed relation; and individual anodes may be removed from the array by undoing the fixing means. An exemplary multi-anode detector array of this nature is schematically illustrated in a sectional side elevational view in FIG. 5 at the reference numeral 500. In the array 500, an upper anode 502 includes an upper signal line 504 and an upper ground line 506 spaced by an upper dielectric layer 508, and a lower anode 510 includes a lower signal line 512 and a lower ground line 514 separated by a lower dielectric layer 516. While not fully illustrated in FIG. 5, the signal lines 504 and 512 are orthogonally aligned so that the resulting detector provides two-dimensional coordinate data, with the upper signal line 504 extending in a direction perpendicular to the plane of the drawing and the lower signal line 512 extending parallel to the plane of the drawing. Spacers 518 maintain the upper and lower anodes 502 and 510 in parallel spaced relationship with the upper ground line 506 spaced from the lower signal line 512. The upper and lower anodes 502 and 510 may incorporate many of the structural features noted earlier, and as is typical in multi-anode arrays, the dielectric layer 508 of the upper anode 502 is removed between the upper signal and ground lines 504 and 506 to better allow the electron cloud to reach the lower anode 510.

The spacers 518, which are schematically illustrated, may take the form of any structures which hold the upper and lower anodes 502 and 510 in the relationship illustrated. Most preferably, the anodes 502 and 510 are removably held by the spacers 518 so that they may be removed and replaced when desired, and so that the spacing between the upper and lower anodes 502 and 510 may be adjusted as desired. Referring back to FIGS. 3 and 4, wherein the delay line anodes 300 and 400 were respectively illustrated with mounting holes 314 and 406, one may contemplate simple and inexpensive spacers 518 taking the form of threaded rods extending through the mounting holes 314/408, and adjustably bearing the anodes 302/402 thereon by sandwiching them between nuts and/or washers threaded onto the rod. As another alternative, such a threaded rod may engage the material bounding the mounting holes 306/408 so that the anodes 300/400 may be repositioned along the rods by rotating them. In view of the foregoing discussion, one of ordinary skill should be able to contemplate a wide variety of removable and adjustable (and/or permanent and fixed) spacers, for example, the use of slabs or sections of materials between anodes to space them apart; rods, tracks, or slides, which may allow continuous repositioning of anodes (as with the aforementioned threaded rod) or discrete repositioning (as with a ratcheting track); or the use of expansible and contractible structures, such as piezoelectric elements or hydraulic or pneumatic cylinders or bladders, which allow spacing to be readjusted as the user desires. The invention also encompasses the use of any of the foregoing arrangements wherein the arrangements are not fixed to the anodes themselves, but on frames associated with the anodes or other structure which engages or cradles the anodes at their edges.

There are several advantages with the aforementioned adjustable and/or removable spacing arrangement. First, the ability to adjust the distance between the upper and lower anodes 502 and 510 allows a user to diminish the crosstalk effect of the upper signal line 504 on the lower signal line 512 to a desired degree by simply increasing the distance between the anodes 502 and 510. In practice, the distance at which the effect of the upper signal line 504 on the lower signal line 512 is negligible occurs at a distance that otherwise does not affect the performance of the detector array 500. It is alternatively or additionally possible to adjust the distance between the upper and lower anodes 502 and 510 to attain a desired amount of electrical impedance in the lower anode 510, and between the anodes and their associated components in the detector system, which is highly advantageous since such impedance balancing is critical for high-speed applications. Typically, the distance at which the top anode 502 strongly affects the impedance of the bottom anode 510 is approximately a few times the dielectric thickness of the bottom anode 510. As the bottom anode 510 is mounted closer to the top anode 502, the impedance of the lower anode 510 is reduced. For example, if the timing components are designed for a 50 ohm impedance (as is standard for many high speed applications and interconnection), and the lower anode 510 has an impedance of approximately 60 ohms, the spacing between the upper and lower anodes 502 and 510 can be adjusted such that the effect of the top anode 502 on the bottom anode 510 results in a decrease of the impedance of the bottom anode 510 to the required 50 ohms. In practice, the standard range of adjustability afforded by multi-anode detector arrays constructed in accordance with this document, and wherein such detector arrays were constructed for atom probe microscopy applications (as discussed in U.S. Pat. Nos. 5,061,850, 5,347,132, and 5,440,124), results in a reduction of the lower anode impedance of approximately 1–3 percent if the anodes are relatively far apart (approximately 10× the thickness of the lower anode, typically 0.5 to 1 mm) and 20–50 percent if the anodes are relatively close together (at a distance similar to the dielectric thickness, typically 0.05 to 0.15 mm). The variation in impedance with changing spacing is continuous, with changes in impedance becoming negligible once the distance is sufficiently increased.

Figure 2:
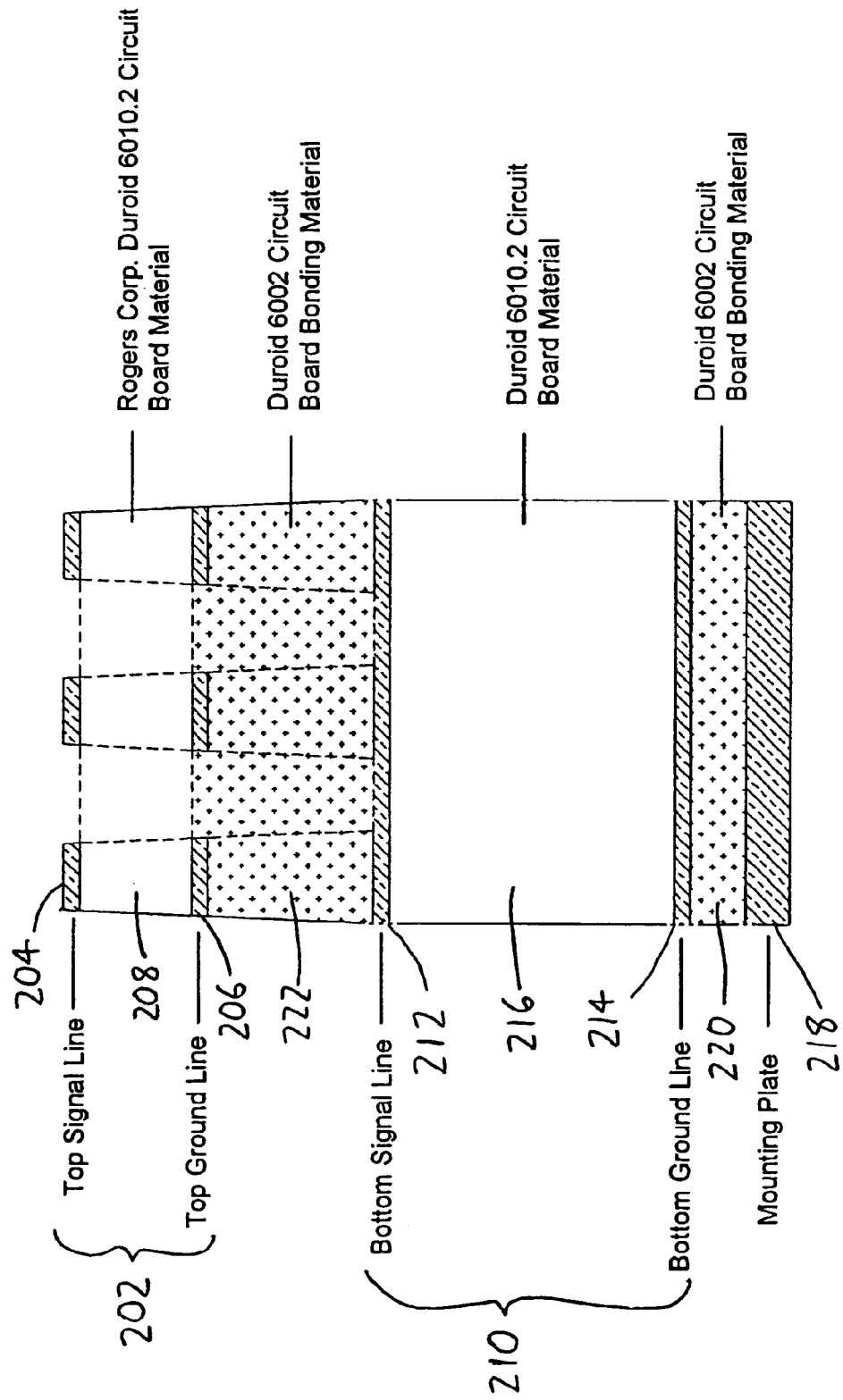
FIG. 2 is a sectional elevational view of a delay line anode manufactured in accordance with known laser ablation techniques.

A second advantage of the spacing arrangement is that the elimination of an adhesive layer between anodes (e.g., elimination of the upper bonding agent layer 222 in the arrangement of FIG. 2), or at the very least diminishing the thickness of such an adhesive layer, can eliminate or reduce variations in spacing between the anodes 502 and 510. This also results in more consistent electrical properties between the two signal lines 504 and 512, which can significantly reduce cost because both anodes 502 and 510 can use the same timing and other components. Additionally, since the bonding agent between anodes—which generally has a relatively high dielectric constant—is eliminated, crosstalk between the upper and lower signal lines 504 and 512 is reduced. Further, depending on the type of spacers 518 used, the upper and lower anodes 502 and 510 may allow adjustment of not only the spacing between the anodes, but also adjustment of the orthogonal (or other) alignment between the upper signal line 504 and the lower signal line 512.

Figure 6:
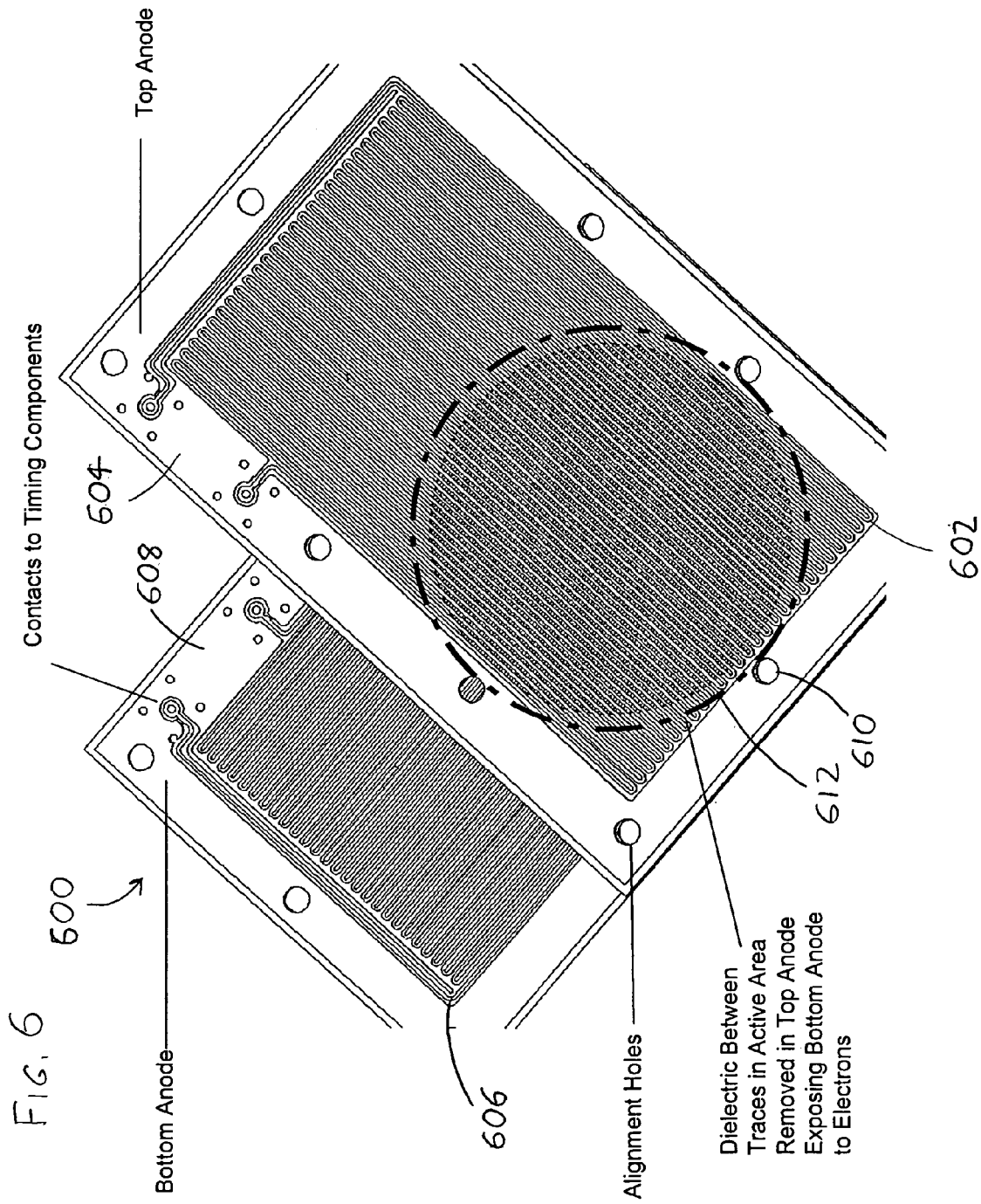
FIG. 6 is a top perspective view of an exemplary dual-anode array (such as that illustrated in FIG. 5) illustrating the top and bottom anodes 604 and 608, which may be anodes such as those illustrated in FIGS. 3 and 4.

FIG. 6 then provides a top perspective view of a multi-anode detector array 600 wherein the signal line 602 of the upper anode 604 is visible, and a portion of the signal line 606 of the lower anode 608 is also visible from its position beneath the upper anode 604. The signal lines 602 and 606 of the upper and lower anodes 604 and 608 are orthogonally arrayed so as to provide time and position information in two dimensions. While not easily seen in FIG. 6 owing to the level of detail required, the excess dielectric material surrounding the signal line 602 in the upper anode 604 is removed in at least the active area 612 of the upper anode 604, i.e., the region upon which electrons will impinge during ordinary operation of the multi-anode array detector 600. Dielectric materials surrounding the signal line 602 outside of the active area 612 may also be removed if desired, as may be the dielectric surrounding the lower anode signal line 606. The upper and lower anodes 604 and 608 are not permanently attached, but are rather removably and adjustably spaced by use of spacers such as those previously discussed. As an example, bolts may be extended through the upper and lower anodes 604 and 608 via the alignment holes 610, and nuts and/or washers maintained on the bolts can be used to affix and space the anodes 604 and 608 as desired.

Within the detector 600, the anodes 604 and 608 are similarly or identically configured, and have a unique arrangement in that they are oriented with the lengths of their signal lines 602 and 606 in non-parallel directions (more specifically in an orthogonal "V" alignment so as to allow determination of location and timing information in two dimensions), with portions of the lengths of their signal lines 602 and 606 extending outside of the active area 612. There are several advantages with the use of such an arrangement.

First, because of the excess length of the signal lines 602/606 outside of the active area 612, the EMP reception timing difference at the ends of the signal lines 602/606 is increased, allowing greater resolution in time and position measurements.

Second, impedance and attenuation qualities of the detector 600 can be better engineered as desired by providing some of the delay time (i.e., some of the length of the delay line) outside of the active area 612. When designing a detector, common design parameters include the size of the active area 612, the delay line length (which affects resolution), and the impedance of the anodes involved (which also affects resolution owing to interaction with timing components and other components). If the delay line traces are made wider and the dielectric is made thicker—both of which assist in reducing attenuation in the delay line— impedance can be kept constant by extending the length of the delay line. As here, it may be necessary to extend the delay line out of the active area in order to obtain the desired characteristics. It is noted that while reduction of attenuation is a beneficial result, there are practical limits to how much reduction can be achieved because increased line width also decreases the number of lines that may be fit within any active area, and it is desirable to have an electron cloud hit at least three adjacent signal lines for best resolution.

A multi-anode array resembling the array 600 has been constructed, and has an active area of approximately 45 mm×45 mm with each parallel length of delay line being approximately 65 mm long (and thus having approximately 20 mm extending outside of the active area). The total delay of the entire delay line is approximately 23 ns. If the entire 23 ns delay was fit onto a 45 mm×45 mm detector, each delay line would need to be about ⅔ as wide, and as a result the DC resistance would go up by a factor of about 3/2. Additionally, the dielectric would need to be about ⅔ as thick to maintain the impedance constant. This would make the anodes more difficult to manufacture because the signal line (and ground line) width would become sufficiently small that its construction would be a matter of non-routine manufacturing practice, at least at the time this document is written. Manufacturing is also made more difficult in that the thinner trace widths are more easily damaged by any adjacently-performed dielectric removal processes, e.g., laser ablation or milling of the excess dielectric adjacent to the delay line on the upper anode. Reducing the dielectric thickness to keep the impedance constant would also significantly increase attenuation since thinner dielectric results in higher skin losses (in addition to the increase in DC resistance from narrower trace width). Overall, attenuation would be roughly four times greater. Thus, while the multi-anode array arrangement shown in FIG. 6 requires extra material and processing time for the portions of the delay line extending outside of the active area 612, the additional material and processing costs will often be worthwhile. It is noted that if the additional space occupied by the anodes owing to the extension of their delay lines out of their active areas gives rise to problems owing to space constraints, these problems might be alleviated by utilizing the laminated or flex circuit anodes previously noted in this document. This might allow the portions of the anodes resting outside the active areas to be bent/folded out of the way. Thus, it can be appreciated that another advantage of flexible anodes is that they might effectively be made as large as or only slightly larger than their active areas, but may attain the advantages of anodes with larger areas (and longer and/or thicker delay lines) without the sacrifices these generally involve.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, it should be understood that since the detectors and delay line anodes of FIGS. 3–6 are merely exemplary versions shown for the sake of enhancing the reader's understanding, the invention is not limited to those versions shown. Anodes utilizing different signal and ground line dimensions and configurations are encompassed by the invention (e.g., non-serpentine arrays), anodes may be differently sized and shaped, and numerous other changes can be made to the illustrated versions while still leaving them within the scope of the claims.

Second, it is noted that when multi-anode arrays are formed, all of the anodes involved may be similarly or identically formed, with patterned signal and ground layers separated by a dielectric layer (and wherein the signal layer and ground layers may be identically patterned, save that the ground line of the patterned ground layer generally has grounding tabs or other grounding leads extending from the ground line at various locations). While this can be advantageous for purposes of uniform component manufacturing practices and uniform performance characteristics, it is noted that the anodes need not be identical. As examples, the lowermost anode need not have excess dielectric material surrounding its signal line removed, nor need it have a patterned ground layer; a grounding plane rather than a grounding line may suffice. As other possibilities, the anodes included in an array need not be manufactured using the same methods—for example, anodes may be chosen from any combination of the known printed circuit board or other methods of the prior art, or the lamination or flex circuit methods discussed in this document—and they may be used in non-orthogonal array orientations, in arrays using more than two anodes, non-parallel arrays, and so forth.

Third, while this document has generally shown and discussed multi-anode arrays utilizing two anodes, the invention can be implemented in multi-anode arrays utilizing more than two anodes. It can also be implemented in only a single anode in applications where multi-dimensional timing and location information is not critical, for example, where one-dimensional information is sufficient, or where information in other dimensions is obtained through use of other instruments or schemes.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A particle detector comprising:
   a. a first delay line anode including an elongated first anode signal line, a first anode ground layer, and a first anode dielectric layer therebetween;
      the first delay line anode further including a first anode active area upon which particles impinge, the first anode active area containing at least a portion of the first anode signal line thereon;
   b. a second delay line anode including an elongated second anode signal line, a second anode ground layer, and a second anode dielectric layer therebetween;
      the second delay line anode further including a second anode active area which receives particles from the first anode active area, the second anode active area containing at least a portion of the second anode signal line thereon;
   wherein at least a portion of the second anode active area has the thickness of its second anode dielectric layer being identical to that of the first anode dielectric layer in the first anode active area.

2. The particle detector of claim 1 further wherein at least a portion of the second anode active area has the configuration of its second anode signal line being identical to that of the first anode signal line in the first anode active area.

3. The particle detector of claim 2 further wherein at least a portion of the second anode active area has the configuration of its second anode ground layer being identical to that of the first anode ground layer in the first anode active area.

4. The particle detector of claim 1 further wherein at least a portion of the second anode active area has the thickness of its second anode ground layer being identical to that of the first anode ground layer in the first anode active area.

5. The particle detector of claim 4 further wherein at least a portion of the second anode active area has the configuration of its second anode ground layer being identical to that of the first anode ground layer in the first anode active area.

6. The particle detector of claim 1 wherein no structure is interposed between the first anode active area and the second anode active area.

7. The particle detector of claim 6 wherein one of:
   a. vacuum, or
   b. a gas
   is interposed between the first and second delay line anodes.

8. The particle detector of claim 1 wherein the second delay line anode may be interchanged with the first delay line anode, whereby the second anode active area receives particles from the first anode active area, without substantial effect on detector performance.

9. The particle detector of claim 1 wherein the first and second delay line anodes are adjustably mounted in spaced relation to have adaptable spacing therebetween.

10. The particle detector of claim 1 wherein at least one of the first and second delay line anodes has:
    a. its signal line and ground layer defined by metallic foil, and
    b. its dielectric layer defined by a thermoplastic film,
    wherein the signal line and ground layer are laminated onto opposite sides of the dielectric layer.

11. The particle detector of claim 1 wherein at least one of the first and second delay line anodes is formed of flex circuit material.

12. A particle detector comprising:
a. a first delay line anode having a first anode active area thereon, upon which particles impinge;
b. a second delay line anode having a second anode active area thereon, upon which particles are received from the first delay line anode;
wherein:
(1) no structure is interposed between the first anode active area and the second anode active area,
(2) the first and second delay line anodes each include a signal layer and a ground layer with a dielectric layer interposed therebetween, and
(3) the dielectric layer of the first delay line anode has the same thickness as the dielectric layer of the second delay line anode.

13. The particle detector of claim 12 wherein the first anode active area and second anode active area are spaced by:
a. vacuum, or
b. a gas.

14. The particle detector of claim 12 wherein the first and second delay line anodes are adaptably mounted in spaced relation to have adjustable spacing therebetween.

15. The particle detector of claim 14 wherein the first anode active area and second anode active area are spaced by:
a. vacuum, or
b. a gas.

16. The particle detector of claim 12 wherein the signal layer has an elongated signal line defined thereon, and wherein the signal line of the first delay line anode is identical to the signal line of the second delay line anode.

17. A particle detector comprising:
a. a first delay line anode including an elongated first anode signal line, a first anode ground layer, and a first anode dielectric layer therebetween;
the first delay line anode further including a first anode active area upon which particles impinge, the first anode active area containing at least a portion of the first anode signal line thereon;
b. a second delay line anode including an elongated second anode signal line, a second anode ground layer, and a second anode dielectric layer therebetween;
the second delay line anode further including a second anode active area which receives particles from the first anode active area, the second anode active area containing at least a portion of the second anode signal line thereon;
wherein the first and second delay line anodes:
(1) are spaced by a vacuum or by gas; and
(2) the first anode dielectric layer has the same thickness as the second anode dielectric layer.

18. The particle detector of claim 17 wherein the first and second delay line anodes are adaptably mounted in spaced relation to have adjustable spacing therebetween.

19. The particle detector of claim 17 wherein the first and second delay line anodes are identical.

20. The particle detector of claim 17 wherein the first and second delay line anodes are interchangeable within the particle detector without substantial effect on detector performance.

21. The particle detector of claim 17 wherein the length of the second delay line anode's elongated signal line resting within the second anode active area has a configuration and dimensions identical to the portion of the first delay line anode's elongated signal line resting within the first anode active area.

22. The particle detector of claim 17 wherein at least one of the first and second delay line anodes is defined by metallic foil layers laminated onto opposing sides of a thermoplastic film.

23. The particle detector of claim 17 wherein at least one of the first and second delay line anodes is formed of flex circuit material.

24. The particle detector of claim 17 wherein at least one of the first and second delay line anodes is sufficiently flexible that it may be bent to adopt an angle of curvature of at least 45° without breaking.

25. The particle detector of claim 17 wherein the first and second delay line anodes include parallel lengths of signal line, wherein:
a. several lengths extend at least partially outside of the anode's active area, and
b. the lengths of signal line in the first delay line anode extend at a non-parallel angle with respect to the lengths of signal line in the second delay line anode.

26. A particle detector comprising:
a. a first delay line anode including an elongated first anode signal line, a first anode ground layer, and a first anode dielectric layer therebetween;
the first delay line anode further including a first anode active area upon which particles impinge, the first anode active area containing at least a portion of the first anode signal line thereon;
b. a second delay line anode including an elongated second anode signal line, a second anode ground layer, and a second anode dielectric layer therebetween;
the second delay line anode further including a second anode active area which receives particles from the first anode active area, the second anode active area containing at least a portion of the second anode signal line thereon;
wherein;
(1) the first and second delay line anodes are adaptably mounted in spaced relation to have adjustable spacing therebetween, and
(2) at least one of the first and second delay line anodes is sufficiently flexible that it may be bent to adopt an angle of curvature of at least 45° without breaking.

27. The particle detector of claim 26 wherein the first and second delay line anodes are identical.

28. The particle detector of claim 26 wherein the first and second delay line anodes are interchangeable within the particle detector without substantial effect on detector performance.

29. The particle detector of claim 26 wherein the length of the second delay line anode's elongated signal line resting within the second anode active area has a configuration and dimensions identical to the portion of the first delay line anode's elongated signal line resting within the first anode active area.

30. The particle detector of claim 26 wherein at least one of the first and second delay line anodes is defined by metallic foil layers laminated onto opposing sides of a thermoplastic film.

31. The particle detector of claim 26 wherein at least one of the first and second delay line anodes is formed of flex circuit material.

32. The particle detector of claim 26 wherein the first and second delay line anodes include parallel lengths of signal line, wherein:
a. several lengths extend at least partially outside of the anode's active area, and b. the lengths of signal line in the first delay line anode extend at a non-parallel angle with respect to the lengths of signal line in the second delay line anode.

33. The particle detector of claim 26 wherein vacuum is interposed between the first and second delay line anodes.

34. The particle detector of claim 26 wherein a gas is interposed between the first and second delay line anodes.

35. The particle detector of claim 26 wherein the dielectric layer of the first delay line anode has the same thickness as the dielectric layer of the second delay line anode.

36. A particle detector comprising:
   a. a first delay line anode including an elongated first anode signal line, a first anode ground layer, and a first anode dielectric layer therebetween;
      the first delay line anode further including a first anode active area upon which particles impinge, the first anode active area containing at least a portion of the first anode signal line thereon;
   b. a second delay line anode including an elongated second anode signal line, a second anode ground layer, and a second anode dielectric layer therebetween;
      the second delay line anode further including a second anode active area which receives particles from the first anode active area, the second anode active area containing at least a portion of the second anode signal line thereon;
   wherein:
   (1) the first and second delay line anodes are adaptably mounted in spaced relation to have adjustable spacing therebetween, and
   (2) the dielectric layer of the first delay line anode has the same thickness as the dielectric layer of the second delay line anode.

37. The particle detector of claim 36 wherein the first and second delay line anodes are identical.

38. The particle detector of claim 36 wherein the first and second delay line anodes are interchangeable within the particle detector without substantial effect on detector performance.

39. The particle detector of claim 36 wherein the length of the second delay line anode's elongated signal line resting within the second anode active area has a configuration and dimensions identical to the portion of the first delay line anode's elongated signal line resting within the first anode active area.

40. The particle detector of claim 36 wherein at least one of the first and second delay line anodes is defined by metallic foil layers laminated onto opposing sides of a thermoplastic film.

41. The particle detector of claim 36 wherein at least one of the fast and second delay line anodes is formed of flex circuit material.

42. The particle detector of claim 36 wherein at least one of the first and second delay line anodes is sufficiently flexible that it may be bent to adopt an angle of curvature of at least 45° without breaking.

43. The particle detector of claim 36 wherein the first and second delay line anodes include parallel lengths of signal line, wherein:
   a. several lengths extend at least partially outside of the anode's active area, and
   b. the lengths of signal line in the first delay line anode extend at a non-parallel angle with respect to the lengths of signal line in the second delay lie anode.

44. The particle detector of claim 36 wherein vacuum is interposed between the first and second delay line anodes.

45. The particle detector of claim 36 wherein a gas is interposed between the first and second delay line anodes.

\* \* \* \* \*